(12) United States Patent
Kapus

(10) Patent No.: US 8,511,288 B2
(45) Date of Patent: Aug. 20, 2013

(54) METHOD FOR OPERATING AN INTERNAL COMBUSTION ENGINE

(75) Inventor: Paul Kapus, Judendorf (AT)

(73) Assignee: AVL List GmbH, Graz (AT)

( * ) Notice: Subject to any disclaimer, the term of this patent is extended or adjusted under 35 U.S.C. 154(b) by 764 days.

(21) Appl. No.: 12/656,157

(22) Filed: Jan. 19, 2010

(65) Prior Publication Data

US 2010/0199665 A1    Aug. 12, 2010

(30) Foreign Application Priority Data

Jan. 19, 2009  (AT) .................................. A 81/2009

(51) Int. Cl.
*F02B 33/00*    (2006.01)

(52) U.S. Cl.
USPC ................... 123/562; 60/611; 60/612; 60/602

(58) Field of Classification Search
USPC .................... 60/611, 612, 602; 123/562, 564
See application file for complete search history.

(56) References Cited

U.S. PATENT DOCUMENTS

| | | | |
|---|---|---|---|
| 6,378,308 B1 * | 4/2002 | Pfluger | 60/612 |
| 2006/0123782 A1 * | 6/2006 | Rosin et al. | 60/599 |
| 2010/0100300 A1 * | 4/2010 | Brooks et al. | 701/102 |
| 2011/0023848 A1 * | 2/2011 | Schwarte | 123/568.21 |

FOREIGN PATENT DOCUMENTS

| | | | |
|---|---|---|---|
| DE | 102004005945 | | 9/2005 |
| DE | 102004005945 A1 * | | 9/2005 |
| DE | 102007017828 | * | 10/2008 |
| EP | 1519017 A1 * | | 3/2005 |
| FR | 2909132 A1 * | | 5/2008 |
| FR | 2917125 A1 * | | 12/2008 |
| JP | 2005315163 A * | | 11/2005 |
| JP | 2009097362 A * | | 5/2009 |

OTHER PUBLICATIONS

Machine Translation of DE-102004005945.*
Machine Translation of JP-2009-097362.*
English Abstract of DE102004005945.

* cited by examiner

*Primary Examiner* — Thomas Denion
*Assistant Examiner* — Patrick Maines
(74) *Attorney, Agent, or Firm* — Dykema Gossett PLLC

(57) ABSTRACT

The invention relates to a method for operating an internal combustion engine (1) with two-stage turbocharging by a low-pressure exhaust gas turbine (6) and a high-pressure exhaust gas turbine (7), the low-pressure exhaust gas turbine (6) being positioned downstream of the high-pressure exhaust gas turbine (7) in the exhaust system (3) of the internal combustion engine (1), and the high-pressure exhaust gas turbine (7) being provided with a bypass line (11) with a control valve (12). In order to achieve quick response of the internal combustion engine (1) in transient operation, it is provided that continuously or periodically at certain intervals preferably an electronic control unit will check whether a steady-state or a transient operating state of the internal combustion engine (1) is prevailing, and that the control valve (12) is controlled in accordance with at least one steady-state characteristic map (32, 33) in the steady-state case and in accordance with at least one transient characteristic map (31) or a transient function in the transient case.

12 Claims, 3 Drawing Sheets

METHOD FOR OPERATING AN INTERNAL COMBUSTION ENGINE

BACKGROUND OF THE INVENTION

The invention relates to a method of operating an internal combustion engine with two-stage turbocharging by a low-pressure exhaust gas turbine and a high-pressure exhaust gas turbine, the low-pressure exhaust gas turbine being positioned downstream of the high-pressure exhaust gas turbine in the exhaust system of the internal combustion engine, and the high-pressure exhaust gas turbine being provided with a bypass line including a control valve.

DESCRIPTION OF PRIOR ART

From DE 10 2004 005 945 B4 a method is known for boost pressure control in an internal combustion engine with two-stage exhaust gas turbocharging with a first and a second turbocharger whose compression power may be individually adjusted by an adjusting element. Depending on charging pressure target values, presetting values for the adjusting elements of the turbochargers are computed. Furthermore, depending on the control difference between actual charging pressure and charging pressure target value a single control correction value for correcting the presetting values of both adjusting elements is computed in a joint controller. From the presetting values and the control correction value corrected setting values are computed in a coordination unit, which are applied to the adjusting elements of the turbochargers, the coordination unit switching between a charging pressure reduction strategy and a charging pressure increasing strategy depending on the sign of the control correction value.

If the turbochargers have different sizes there is danger that in the transient case load increase at medium engine speeds is too slow due to the inertia of the larger turbocharger, which will result in significant transient power losses.

SUMMARY OF THE INVENTION

It is the object of the present invention to avoid the above disadvantage and to permit fast load increase at medium engine speeds.

This object is achieved by providing that an electronic control unit will check continuously or periodically at certain intervals whether steady-state or transient operating conditions of the internal combustion engine are present, and that the control valve is controlled in accordance with at least one steady-state characteristic map in the steady-state case and in accordance with at least one transient characteristic map or a transient function in the transient case.

Depending on the load demand the control valve is controlled by means of a transient characteristic map or via a transient function. In the steady-state case, however, the control valve is controlled by means of a steady-state characteristic map. Thus it will be ensured that the switch from low-pressure turbocharger to high-pressure turbocharger is effected adaptively, avoiding a loss of load in transient operation.

In two-stage sequential charging the high-pressure turbocharger is fed by the low-pressure turbocharger. The low-pressure turbocharger blows air into the high-pressure turbocharger. At a certain predefined engine speed the high-pressure turbocharger is by-passed and the low-pressure turbocharger alone does all the work. Switching from the smaller high-pressure turbocharger to the larger low-pressure turbocharger must be carried out by means of a transient function or via a transient characteristic map.

If the low-pressure exhaust gas turbine has a bypass line with a wastegate, it is of particular advantage if the wastegate is controlled in transient operation by means of a transient characteristic map or via a transient function. Control of the control valve of the high-pressure exhaust gas turbine and of the wastegate of the low-pressure exhaust gas turbine thus is coordinated and is effected via transient functions or transient characteristic maps. It is thus ensured that the transition from high-pressure turbocharger to low-pressure turbocharger occurs at optimum speed.

In the context of the invention it may furthermore be provided that a transient operational state is diagnosed from the deviation between actual and demanded load state, the load state being derived from the charging pressure. Distinguishing between transient and steady-state operation may be done independently for the wastegate and the control valve.

The control valve and the wastegate each has a P-I controller (Proportional Integral controller) superimposed on the transient characteristic maps or the transient functions and on the steady-state characteristic maps. The P-I controllers can be complemented by a D-function (derivative function).

In the context of the invention it may furthermore be provided that for fast heating-up of an exhaust treatment device the control valve and/or the wastegate open via a steady-state heating-up characteristic map.

BRIEF DESCRIPTION OF THE DRAWINGS

The invention will now be described in more detail with reference to the enclosed drawings. There is shown in FIG. 1 a schematic drawing of an internal combustion engine implementing the method of the invention.

DETAILED DESCRIPTION OF THE PREFERRED EMBODIMENT

Figure 1:
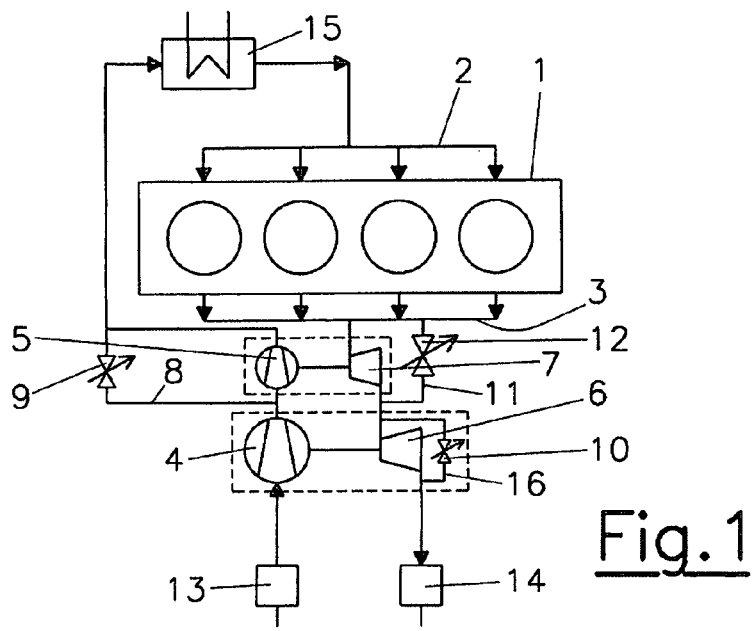

FIG. 1 schematically shows an internal combustion engine 1 with an intake system 1 and an exhaust system 3. The internal combustion engine 1 has two-stage turbocharging with a low-pressure compressor 4 and a high-pressure compressor 5, the low-pressure compressor 4 being driven by a low-pressure exhaust gas turbine 6, the high-pressure compressor by a high-pressure exhaust gas turbine 7. The high-pressure compressor 5 can be by-passed by means of a bypass line 8, in which a flap 9 is disposed. The high-pressure exhaust gas turbine 7 can be bypassed by means of a bypass line 11 provided with a control valve 12. A bypass line 16 containing a wastegate 10 is provided for by-passing the low-pressure exhaust gas turbine 6.

An air filter is provided upstream of the low-pressure compressor 4. Reference numeral 14 indicates an exhaust treatment device in the exhaust line 3, for instance a catalytic converter.

Intake air is fed to the internal combustion engine 1 via the low-pressure compressor 4 and/or the high-pressure compressor 5 and the intake air cooler 15. At low engine speeds both compressors 4, 5 are active, with charging pressure being supplied mainly by the high-pressure compressor 5. Once the low-pressure compressor 4 is delivering sufficient charging pressure, the high-pressure compressor 5 is by-passed upwards of a certain engine speed and load, the larger low-pressure compressor 4 taking over. The flap 9 may be spring-loaded, opening at a certain predetermined difference between the charging pressures of high- and low-pressure compressor.

It is necessary to effect the switch from high-pressure compressor 5 to low-pressure compressor 4 by means of a transient function. Depending on the load demand the control valve 12, for instance implemented as a flap, is controlled by means of a characteristic map other than a steady-state characteristic map.

This is necessary since the load increase would otherwise be too slow due to the inertia of the larger low-pressure compressor 4. In transient operation the smaller high-pressure compressor 5 must thus support charging by the low-pressure compressor 4.

Simultaneously the wastegate 10 of the low-pressure exhaust gas turbine 6 is adjusted via a transient characteristic map or a transient function.

Both the control valve 12 and the wastegate 10 have a P-I controller each superimposed on the transient characteristic map or function and the steady-state characteristic map. The P-I controller may be complemented by a D-function.

To achieve fast heating-up of the exhaust treatment device 14, it will furthermore be of advantage to open the control valve 12 in accordance with a heating-up characteristic map. The wastegate 10 may also be opened according to its own heating-up characteristic map. Thus during heating-up operation of the catalytic converter a heating-up characteristic map is used instead of the normal steady-state characteristic map.

Figure 2:
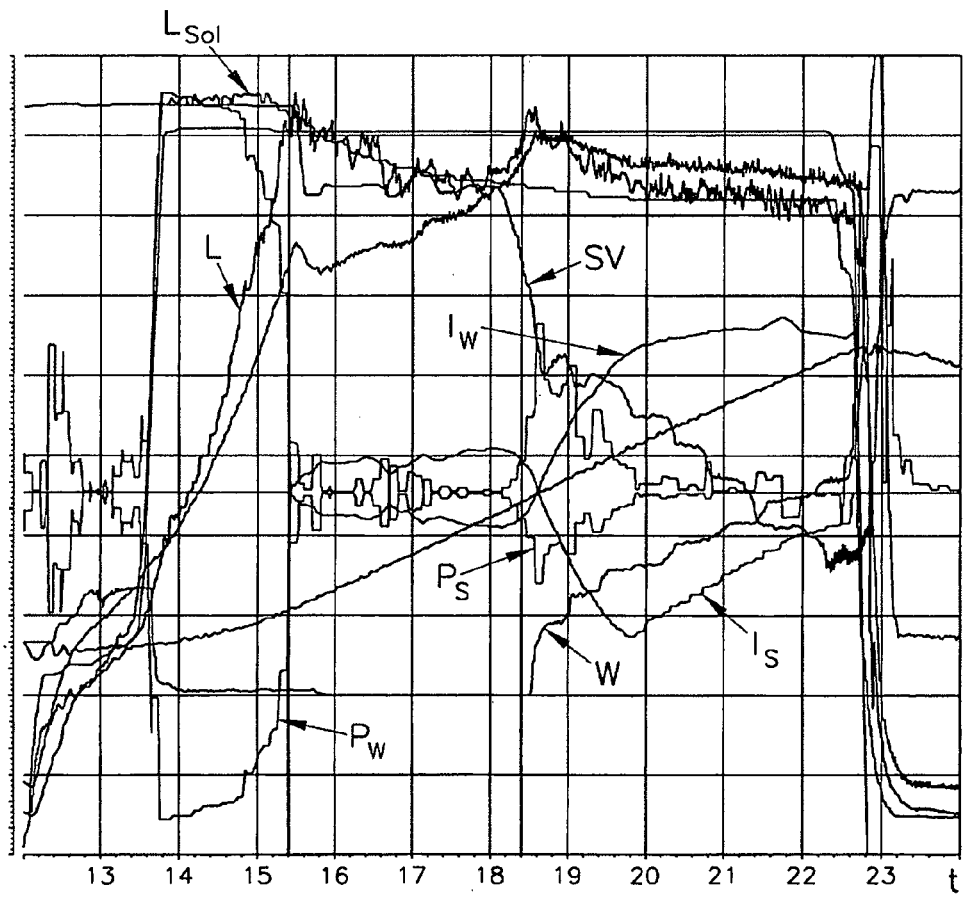
FIG. 2 operational parameters at full load acceleration plotted over time.

FIG. 2 shows an engine test run for full load acceleration. L indicates the actual charge, $L_{sol}$ the target charge. If the difference between target charge $L_{sol}$ and actual charge L exceeds a predefined charge deviation $\Delta L$, a transient operational state is inferred. In this case a transient bit $TB_S$ for the control valve 12 and a transient bit $TB_W$ for the wastegate 10 is set. The control valve 12 is subsequently controlled according to a transient characteristic map or a transient function, with control being effected by a P-I controller (proportional integral controller). In the same way the wastegate 10 may be controlled according to a transient characteristic map or a transient function, with its own P-I controller superimposed. Both P-I controllers, or P-I-D controllers, are active both in the transient and in the steady-state case, and are superimposed on the respective transient or steady-state characteristic maps. The main working region of the P-I controller of the control valve 12 is the region where the high-pressure exhaust gas turbine is active (S1 and S2 in FIG. 3). The P-I controller of the wastegate 10, on the other hand, will mainly be active at high engine speeds. The proportional part of the control of the control valve 12 is indicated in FIG. 2 by reference $P_S$, the integral part by $I_S$. The position of the control valve 12 is represented by curve SV.

In the same way the wastegate 10 is controlled in the transient operational state by means of a transient characteristic map or transient function via a P-I controller. For the wastegate 10 the proportional part is designated $P_W$ and the integral part $I_W$. The curve W represents the wastegate position. Engine speed is designated n in FIG. 2.

Figure 3:
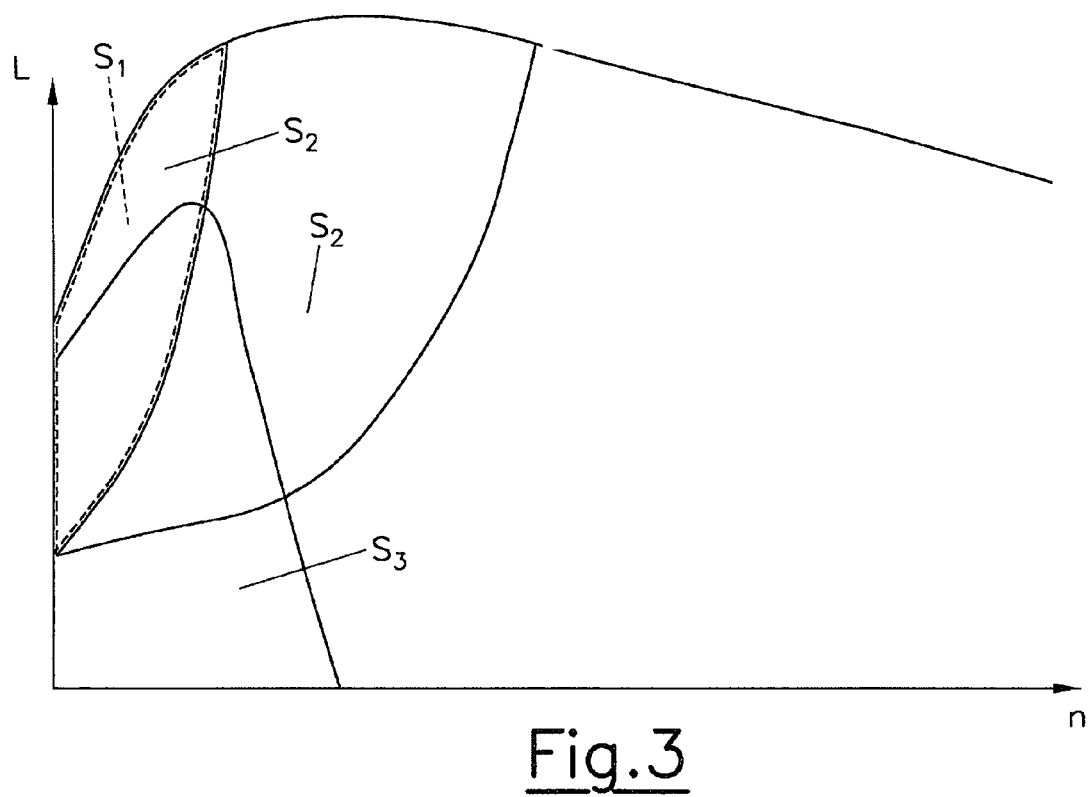
FIG. 3 operating regions of the control valve.

FIG. 3 is a diagram of load L versus engine speed n, where the regions for steady-state use of the control valve 12 are referred to as $S_1$ and the regions for transient use of the control valve 12 as $S_2$. The region $S_3$ corresponds to the heating-up phase of the exhaust treatment device 14. Due to the opening of the control valve 12 there is no flow through the high-pressure exhaust gas turbine 7, and thus heat loss upstream of the exhaust treatment device 14 is reduced.

Figure 4:
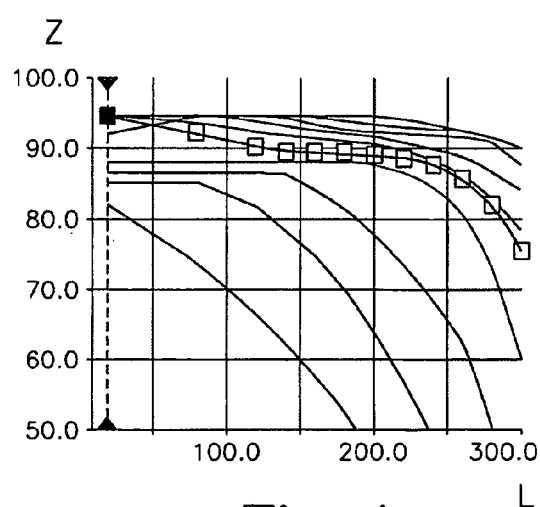
FIG. 4 a steady-state characteristic map.
Figure 5:
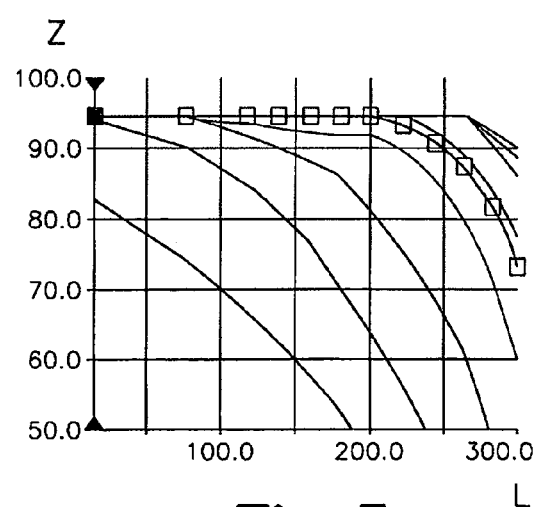
FIG. 5 a transient characteristic map.

FIG. 4 shows an example of a steady-state characteristic map, with a control signal Z for the control valve 12 being plotted as a function of load L. FIG. 5 shows a corresponding transient characteristic map for the control valve 12.

Figure 6:
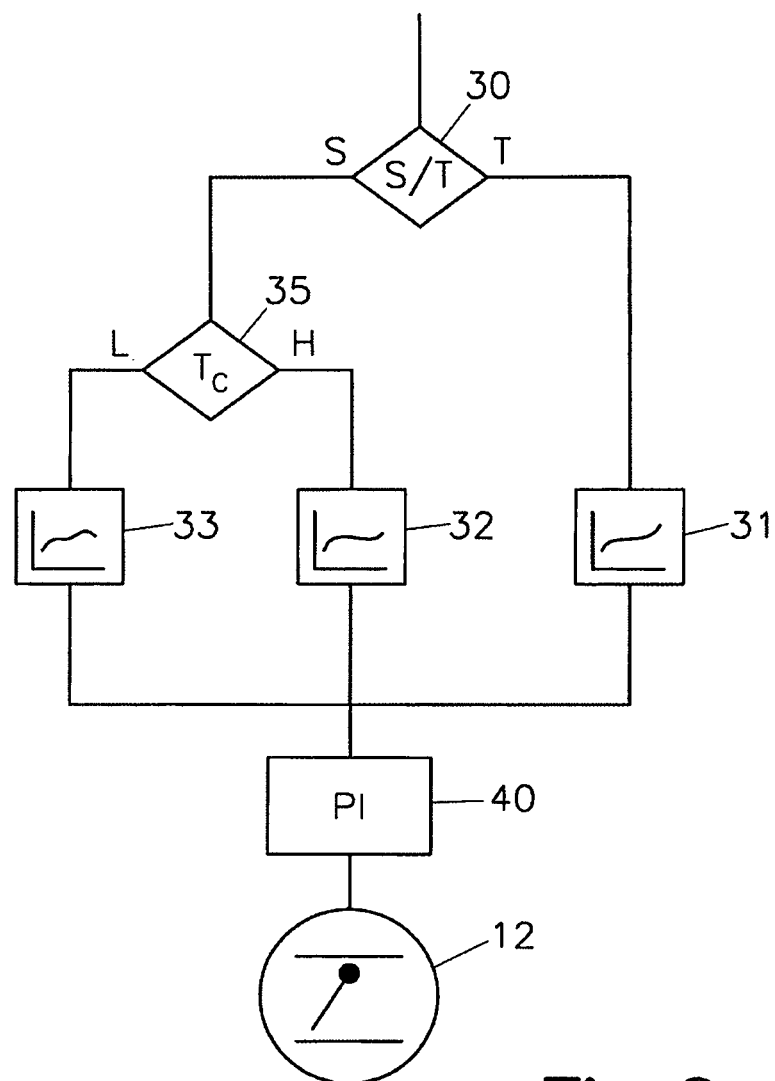
FIG. 6 a block diagram of the method of the invention.

FIG. 6 schematically presents the method of the invention. A first step 30 tests whether operation is steady-state S or transient T. This test is carried out by comparing the demanded target load $L_{SOL}$ to the actual load L and signalling the transient mode T if a difference $\Delta L$ is found. In this case a transient characteristic map 31 is used for controlling the control valve 12 via the P-I controller 40. Otherwise a steady-state mode S is signalled and a steady-state characteristic map 32 is used for control of the control valve 12, or—if test 35 signals that the temperature $T_C$ of the catalytic converter is below a certain target temperature—a heating-up characteristic map 33 is used. An analogous procedure is followed for the wastegate 10, where testing the temperature of the catalytic converter may possibly be omitted.

What is claimed is:

1. A method for operating an internal combustion engine with two-stage turbocharging by a low-pressure exhaust gas turbine and a high-pressure exhaust gas turbine, the low-pressure exhaust gas turbine being positioned downstream of the high-pressure exhaust gas turbine in an exhaust system of the internal combustion engine, and the high-pressure exhaust gas turbine being provided with a bypass line including a control valve, with the low pressure exhaust gas turbine having a bypass line with a waste gate, and with a control unit configured to check an operating condition of the internal combustion engine, comprising the following steps:
   checking either continuously or periodically at certain intervals with the electronic control unit whether the internal combustion engine is operated in a transient or a steady-state operating conditions,
   controlling the control valve in accordance with at least one steady-state characteristic map in the steady-state case and in accordance with at least one transient characteristic map or a transient function in the transient case, and
   controlling the waste gate in the transient operating state via a transient characteristic map or via a transient function, wherein both the control valve and the waste gate are controlled by respective controllers.

2. The method according to claim 1, wherein the waste gate has its own P-I controller which controls the waste gate on the basis of the transient characteristic map or the transient function, as well as on the steady-state characteristic map.

3. The method according to claim 2, wherein said P-I controller has a D-function.

4. The method according to claim 1, wherein checking for a transient operational state is done independently for the control valve and for the waste gate.

5. The method according to claim 4, wherein the waste gate is opened during the heating-up phase of an exhaust treatment device in accordance with a heating-up characteristic map.

6. The method according to claim 5, wherein the heating-up characteristic map is a steady-state map.

7. The method according to claim 1, wherein the control valve has a P-I controller which controls the control valve on the basis of the transient characteristic map or the transient function as well as on the steady-state characteristic map.

8. The method according to claim 7, wherein the P-I controller has a D-function.

9. The method according to claim 1, wherein the presence of a transient operational state is inferred from a deviation between an actual and a demanded load state.

10. The method according to claim 9, wherein the load state is defined by the-charging pressure.

11. The method according to claim 1, wherein the control valve is opened during the heating-up phase of an exhaust treatment device in accordance with a heating-up characteristic map.

12. The method according to claim 11, wherein the heating-up characteristic map is a steady-state map.

* * * * *